3,465,163
United States Patent Office
                                                                                                        Patented Sept. 2, 1969

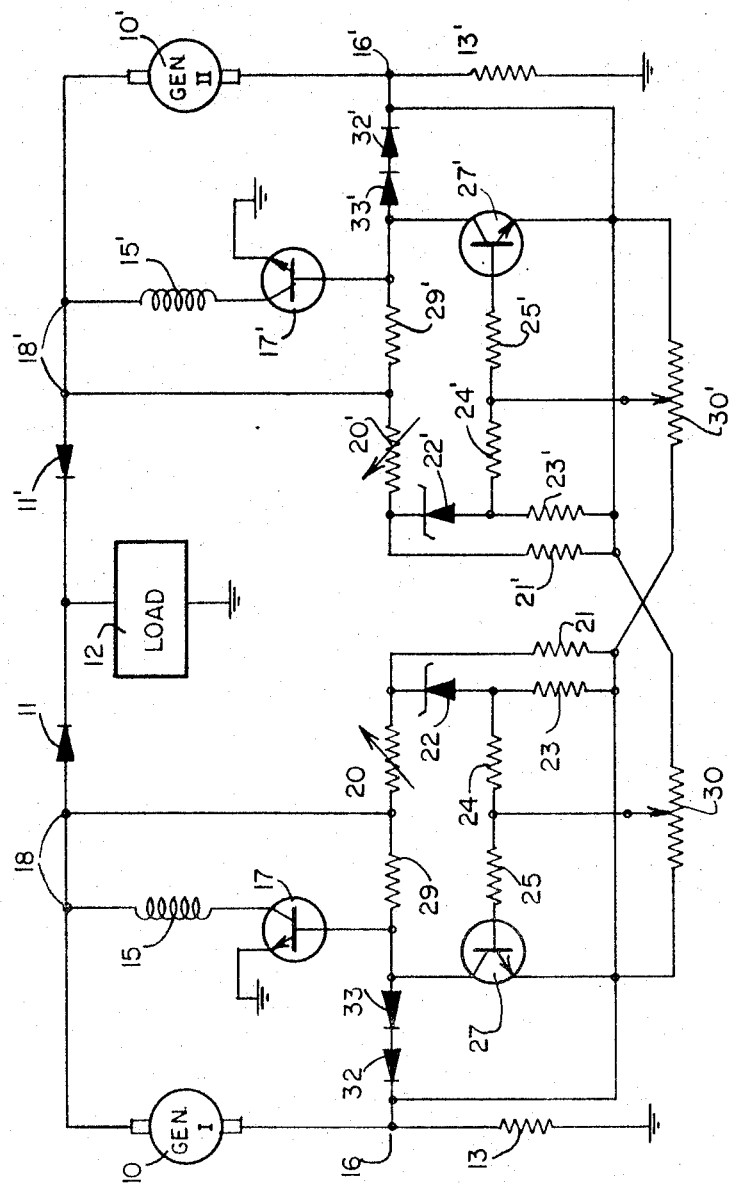

3,465,163
VOLTAGE CURRENT REGULATOR
William H. White, Jr., Wheaton, Ill., assignor to Motorola, Inc., Franklin Park, Ill., a corporation of Illinois
Filed July 29, 1966, Ser. No. 568,846
Int. Cl. H02j 1/10
U.S. Cl. 307—57                            4 Claims

ABSTRACT OF THE DISCLOSURE

Regulator system having control circuits for a pair of direct current generators for controlling the output voltage thereof and including balancing system operating through the control circuits so that the two generators share the load substantially equally. The load current of each generator is applied through a ballast resistor and a pair of potentiometers are connected between the two ballast resistors and each applies a voltage to one control circuit for adjusting the operation thereof so that the generators are controlled to share the load.

---

This invention relates to a control system for parallel operated direct current generators and more particularly to a regulator circuit which is responsive to the output voltage and the load-share of the paralleled generators to control the excitation thereof.

When generators or alternators are connected in parallel to a common utilization network, the problem is encountered of maintaining the control of each generator such that the load is shared by the parallel connected devices. Especially, when the paralleled generators or alternators will be used to supply power for very sensitive electronic equipments, it is highly desirable to utilize a very sensitive voltage and current regulation system for regulating the output voltage and balancing the current between the parellel devices.

Accordingly, it is an object of this invention to provide an improved regulator system for controlling the output voltage of parallel operated generators or alternators.

It is another object to provide an improved current limiting and balancing control for electrical generators or alternators operated in parallel.

It is a further object to provide a regulator for controlling the voltage and the balance of current of two parallel operated generators which is of simple and economical construction, and which is reliable and very sensitive in operation.

A feature of this invention is the provision of a voltage regulator for parallel operated generators which is responsive to the output voltage of the generators, and also to the difference of the voltages developed across ballast resistors which carry the output currents of the paralleled generators.

Another feature of this invention is the provision of a semiconductor control device series connected to the field winding of each of two parallel connected generators which is controlled by a semiconductor control device sensitive to the voltage drop at a ballast resistor for decreasing the current through the field winding when the armature current exceeds a predetermined amount.

The invention is illustrated in the single figure of the drawing which shows a system for controlling the loadshare of two paralleled DC generators.

The generators used in a regulator system according to the invention include first and second output terminals and field windings. Each control circuit comprises a ballast resistor connected to the first output terminal and an output voltage control circuit having first and second transistors. The first transistor is connected in series to the field winding to control the current flow through the field winding controlling the energization of the generator. The second transistor is connected to the base of the first transistor and supplies a control signal as soon as a Zener diode coupled in series to a sensing resistor between the first and second output terminals conducts in response to an increasing output voltage providing a voltage drop across the sensing resistor, thereby rendering the second transistor conductive. The output of the second transistor is applied to the base of the first transistor to decrease the current flow therethrough and thereby diminishing the energization of the generator. For limiting the output armature current, diode means connected between the first output terminal and the base of the first transistor apply a control signal thereto to diminish the current through the field winding and thereby to decrease the energization of the generator when the voltage drop across the ballast resistor exceeds a predetermined level and renders the diode means conductive. For controlling the load balance of the generators, a potentiometer is coupled between the first output terminal of one generator and the first output terminal of the parallel connected associated generator, being responsive to the output current differential between the unbalanced generators. The tap of the potentiometer is coupled to the common junction of the Zener diode and the sensing resistor to provide a control signal at the common junction to render the second transistor non-conductive when the voltage drop across the ballast resistor of the associated generator exceeds a predetermined level, to thereby control through the first and second transistors the energization of the generator.

Referring now to the drawing, there is shown a system including two identical separate regulator circuits which are connected together for the control of the load-share of two paralleled DC generators. Therefore, the same parts of the two circuits are indicated by the same reference numbers and in the identical second circuit corresponding parts will carry the same numbers each followed by a prime mark. The generator 10 is connected with its negative terminal 16 through a ballast resistor 13 to ground potential, whereas the positive terminal 18 of generator 10 is connected through a rectifier 11 and a load 12 to the ground potential. The field winding 15 is connected to terminal 18 and further through a field transistor 17 to ground potential. The field transistor 17 is controlled at its base by a voltage control circuit. The voltage control circuit comprises transistor 27, the collector of which is connected to the base of the field transistor 17, and the emitter of which is connected to negative terminal 16. The base of the field transistor 17 is connected through resistor 29 to the positive terminal 18. A voltage divider comprising variable resistor 20 and resistor 21 is connected between the positive terminal 18 and the negative terminal 16, with a Zener diode 22 in series with a sensing resistor 23 bypassing resistor 21. The common junction of Zener diode 22 and sensing resistor 23 is connected through resistor 24 in series with resistor 25 to the base of transistor 27, with the common junction of resistor 24 and resistor 25 being connected to the adjustable tap of rheostate 30. The common junction of the base of the field transistor 17 and the collector of the transistor 27 is connected through a germanium diode 33 in series with a silicon diode 32 to the negative terminal 16. The two identical circuits comprising generator 10 and generators 10' are connected to the common load 12 and further combined by connecting the negative terminal 16 to one side of rheostats 30' and 30 and the negative terminal 16' to the other side of rheostats 30 and 30'.

In considering the operation of the regulator circuits for two paralleled DC generators, it will be assumed that the generators 10 and 10' are identical and supplying equal amounts of power to the output load 12. This assumption is made to facilitate the description of the operation of the regulator, although this assumption need not necessarily be made. This assumed normal operating condition preferably is that in which transistors 17 and 17' are in the conductive state and transistors 27 and 27' are in a low conductive state. With transistors 17 and 17' in the conductive state and the generator output voltage and output armature current instantaneously at a predetermined level, a current path can be traced from the positive terminals 18 and 18' through field windings 15 and 15' and the collector-emitter path of transistors 17 and 17' to ground potential. A further current path is provided through the voltage dividers 20, 21 and 20', 21' from the positive terminals 18 and 18' to the negative terminals 16 and 16', determining the voltages across the Zener diodes 22 and 22' to keep these diodes nonconductive. If now the generated output voltage should rise, at the same time the voltage across resistors 21 and 21' will rise, and the Zener diodes 22 and 22' will become conductive and thereby raise the voltage across resistors 23 and 23' to render transistors 27 and 27' further conductive. The current flow through transistors 27 and 27' develops a larger voltage drop across resistors 29 and 29' so that the voltage at the base of transistors 17 and 17' drops and reduces the current through these transistors to the field windings 15 and 15' so that the output voltages of the generators decrease. Assume that initially the generated output voltage increased considerably, then the transistors 17 and 17' are turned off causing a considerable decrease of the magnetic field and generator output voltages. As soon as the output voltage at the positive terminal decreases to the desired level, the potential at the Zener diodes will be insufficient to maintain their conduction so that the base voltages of transistors 27 and 27' drop reducing the curent through resistors 29 and 29' tending to render transistors 17 and 17' more conductive, or removing the cutoff potential at the bases of transistors 17 and 17' when these transistors beforehand were regulated to a non-conductive state.

In considering the operation of the output armature current limiting circuit, the total armature current flows through the ballast resistors 13 and 13' associated with the generators 10 and 10'. The current flow through the ballast resistors 13 and 13' produces a potential thereacross such that terminals 16 and 16' are negative with respect to the ground potential. Since the resistors 13 and 13' have a very small resistance, the maximum voltage drop for maximum armature current is only some fraction of a volt. The set level for that negative voltage at terminals 16 and 16' is determined by the junction voltages of diodes 32, 33 and 32', 33'. As already mentioned each diode pair preferably consists of a germanium diode with an offset voltage of 0.2 volt and a silicon diode with an offset voltage of 0.7 volt. Since the base-emitter junction of transistors 17 and 17' also have an offset voltage of 0.7 volt, the base voltage of these transistors during conduction is at a level of +0.7 volt. Therefore, the offsets of the silicon diodes match the offset of the base-emitter junction of transistors 17 and 17'. As soon as the increasing armature current establishes a voltage drop across ballast resistors 13 and 13' which reaches —0.2 volt, the two series connected diodes conduct heavily so that the voltage at the base of the transistors 17 and 17' begins to drop driving the transistors towards turnoff. Thus, the field decreases and the armature current is thereby limited. It is to be understood that the values of the offset voltages of these transistors and diodes may change. The desired current limiting, which occurs with forward conduction, occurs commonly when:

$$V_E = V_{SD} + V_{GD} - V_{BE}$$

where $V_E$ is the voltage drop across the ballast resistor, $V_{SD}$ is the forward conduction voltage of the silicon diode, $V_{GD}$ is the forward conduction voltage of the germanium diode, and $V_{BE}$ is the conduction voltage of the base-emitter junction of the transistor. It is obvious that instead of the series connected diodes, only one diode can be used when the offset voltage of this diode is equal to the base-emitter offset voltage plus the desired voltage drop across the ballast resistor. The point at which the current is limited is controlled by the voltage drop across the ballast resistor, and may be altered by changing the resistance of the ballast resistor.

For the balancing operation of the two paralleled generators 10 and 10', the voltage drop across the ballast resistors 13 and 13' is sensed to balance the load. Assume that generator 10 begins furnishing more current than generator 10', the negative terminal 16 is then more negative than the negative terminal 16'. Thus, a current flows from terminal 16' through a portion of rheostat 30 to the terminal 16, and further through a parallel path consisting of a portion of rheostat 30' also to terminal 16. Current flow through the parallel resistances causes the junction between resistances 24 and 25 to be more positive with respect to 16 than would be the case without potentiometer 30 and causes the junction between resistances 24' and 25' to be more negative with respect to 16' than would be the case without potentiometer 30'. This causes transistor 27 to move toward cutoff and 27' to move toward saturation. In this manner, the output of generator 10' is increased and the output of generator 10 is reduced and a trend toward balanced operation is established. The degree of balance can be adjusted with potentiometers 30 and 30'.

Although the operation of balancing the paralleled generators has been described with reference to an increasing armature current in the generator 10, it is clear that the same description of the operation applies also to an increasing armature current in the generator 10'.

What is claimed is:

1. A regulator system for first and second generators connected in parallel to a common load and each including first and second output terminals and a field winding, said regulator system including a combination, first and second control circuits associated respectively with the generators and each including a ballast resistor connected to the first output terminal of the associated generator, and output voltage control circuit means having first and second semiconductor control devices, said first semiconductor device being coupled to the field winding of the associated generator to control the energization thereof and having a control electrode, said second semiconductor device being coupled to said control electrode of said first semiconductor device, each of said control circuits including control means coupled between the first and second output terminals and responsive to the output voltage of the generator, a Zener diode and resistor means connected in series from said control means to said second semiconductor device for supplying a control signal to said second semiconductor device to operate said first semiconductor device to diminish the current through the field winding when said output voltage renders said Zener diode conductive, and load balancing means coupled between said first output terminal of said first generator and said first output terminal of said second generator, said load balancing means including a potentiometer having a voltage developed thereacross in response to a difference in the output currents of the generators sensed by the voltage drop across said ballast resistors of the associated control circuits, said potentiometer having a tap thereon connected to said resistor means and providing a control signal to said second semiconductor device to thereby control the energization of the field of the associated generator to balance the load currents of the generators.

2. A regulator system according to claim 1 in which said control circuits further include output current limiting means having diode means coupled between said first output terminal and said control electrode and operative to actuate said first semiconductor control device to decrease the energization of the generator in response to a voltage drop across said ballast resistor which renders that diode means conductive.

3. A regulator system according to claim 1 in which each of said control circuits includes a variable resistor and a first resistor series connected between said first and second output terminals, a sensing resistor and said Zener diode series connected between the common junction of said variable and said first resistor and said first output terminal, wherein said first semiconductor control device is a first transistor having base, emitter and collector electrodes, said collector electrode connected to said field winding and said emitter electrode connected to a reference potential, wherein said second semiconductor control device is a second transistor having base, emitter and collector electrodes, said second collector electrode connected to said first base, and the regulator system further includes a second resistor connected between said second collector electrode and the second output terminal and third and fourth resistors series connected between said second base electrode and the common junction of said Zener diode and said sensing resistor, and wherein said potentiometer is connected between the first output terminal of the first generator and the first output terminal of he second generator and has an adjustable tap connected to the common junction of said third and fourth resistors.

4. A regulator system according to claim 1 in which each of said control circuits include diode means and said first semiconductor device comprises a first transistor having a base electrode, said diode means being connected between the first output terminal and said base electrode and having an offset voltage equal to the sum of the offset voltage of said first transistor and a predetermined voltage drop across said balast resistor, said diode means being rendered conductive when said voltage drop across said ballast resistor exceeds said predetermined voltage drop.

References Cited
UNITED STATES PATENTS 2,859,357   11/1958   Schmeling _____ 307—57

ROBERT K. SCHAEFER, Primary Examiner

H. J. HOHAUSER, Assistant Examiner